United States Patent [19]
Loth et al.

[11] Patent Number: 5,118,731
[45] Date of Patent: * Jun. 2, 1992

[54] EARLY-RAIN-RESISTANT JOINT-SEALING COMPOUNDS

[75] Inventors: Helmut Loth, Essen; Klaus Helpenstein, Monchen-gladbach; Tore Podola, Monheim; Bernhard Knop, Monheim-Blee, all of Fed. Rep. of Germany

[73] Assignee: Henkel Kommanditgesellschaft auf Aktien, Duesseldorf-Holthausen, Fed. Rep. of Germany

[*] Notice: The portion of the term of this patent subsequent to Apr. 2, 2008 has been disclaimed.

[21] Appl. No.: 600,454

[22] Filed: Oct. 19, 1990

Related U.S. Application Data

[63] Continuation-in-part of Ser. No. 342,408, Apr. 24, 1989, Pat. No. 5,004,769.

[30] Foreign Application Priority Data

Oct. 19, 1989 [DE] Fed. Rep. of Germany ........ 3934870
Aug. 2, 1990 [DE] Fed. Rep. of Germany ........ 4024551

[51] Int. Cl.⁵ .................. C09D 3/48; C09D 3/18; C09D 5/02; C09K 3/10
[52] U.S. Cl. ........................... 524/43; 524/44
[58] Field of Search ........................ 524/43, 44

[56] References Cited
FOREIGN PATENT DOCUMENTS

| | | |
|---|---|---|
| 1284007 | 1/1975 | Fed. Rep. of Germany . |
| 2415556 | 10/1975 | Fed. Rep. of Germany . |
| 2108365 | 4/1976 | Fed. Rep. of Germany . |
| 3814078 | 11/1989 | Fed. Rep. of Germany . |
| 1069275 | 5/1967 | United Kingdom . |
| 1354436 | 5/1974 | United Kingdom . |

OTHER PUBLICATIONS

Rothenberger et al., "An Elastomeric Roof Mastic Binder With Early Washout Resistance", *Resin Review*, vol. 35, No. 2, pp. 11–18.
Ullman, Enzyklopadie der technischen Chemie, 4th Edition, vol. 9, pp. 208–209.
DIN 52 456 "Bestimmung der Verarbeitbarkeit von Dichtstoffen".
DIN 52 454 "Standvermogen".
E. Flick, "Construction and Structural Adhesives and Sealants", Noyes Publications, Park Ridge, 1988.
E. Flick, "Adhesives and Sealant Compound Formulations", Noyes Publications, Park Ridge, 1978.

*Primary Examiner*—Nathan M. Nutter
*Attorney, Agent, or Firm*—Ernest G. Szoke; Wayne C. Jaeschke; Real J. Grandmaison

[57] ABSTRACT

Early-rain-resistant joint-sealing compounds containing:
 (a) aqueous polymer dispersions (I),
 (b) nonionic cellulose ethers (II) selected from the group consisting of hydroxyethyl, hydroxyethyl-methyl, hydroxypropyl-methyl and hydroxypropyl cellulose,
 (c) optionally typical additives, such as fillers, pigments, plasticizers, extenders, thickeners, foam inhibitors, dispersion aids, pH regulators, preservatives and anti-aging agents, and
 (d) at least one organic liquid component selected from the group of typical additives,
which can be produced by thorough mixing of (I) with the other constituents. To be able to introduce (II) in quantities above the solubility limit, the joint-sealing compounds are characterized in that (II) is added and mixed in retarded and/or non-retarded form in suspension in the liquid organic component.

19 Claims, 1 Drawing Sheet

EARLY-RAIN-RESISTANT JOINT-SEALING COMPOUNDS

This application is a continuation-in-part of U.S. patent application Ser. No. 07/342,408, filed Apr. 24, 1989 and now U.S. Pat. No. 5,004,769.

BACKGROUND OF THE INVENTION

1. Field of the Invention

This invention relates to early-rain-resistant joint-sealing compounds containing (a) aqueous polymer dispersions (I), (b) nonionic cellulose ethers (II) selected from the group consisting of hydroxyethyl, hydroxyethyl methyl, hydroxypropyl methyl and hydroxypropyl cellulose, (c) optionally typical additives, such as fillers, pigments, plasticizers, extenders, thickeners, foam inhibitors, dispersion aids, pH regulators, preservatives and anti-aging agents, and (d) at least one organic liquid component selected from the group of typical additives, which can be produced by thorough mixing of (I) with the other constituents; to a process for the production of these joint-sealing compounds and to their use to a process for the production of these joint-sealing compounds and to their use.

2. Discussion of Related Art

Joint-sealing compounds are known to the expert and have been successfully used in practice. Problems are involved in the use of joint-sealing compounds in applications where there is a possibility or danger of the joint-sealing compound coming into contact with water, for example spray water or rain, before curing. Thus, many of the joint-sealing compounds hitherto used, including those designed for outdoor application, are completely or partly washed out by heavy rainfall beginning shortly after their application. The use of nonionic cellulose ethers in joint-sealing or coating compounds based on acrylate dispersions is known from German Patent 38 14 078-A-1. The use of certain cellulose ethers in these compounds is said to improve wash-out behavior under the effect of water, such as rain water, and also smoothing behavior. The quantities in which the cellulose ethers are used in German Patent 38 14 078-A-1 are based on the solids content of the acrylate dispersion. There is no explicit reference to the ratio of "free" water to the cellulose ethers. Although it is clear from the Examples that the constituents mentioned were mixed in a planetary mixer for the production of a joint-sealing compound, there is no indication of the form or the order in which the individual constituents are mixed with one another.

However, it has been found in practice that, with early-rain-resistant joint-sealing compounds of the type in question, the individual constituents cannot be added in just any order or in just any form in the production of the joint-sealing compounds. For example, although the cellulose ethers mentioned can be scattered in small quantities into certain polymer dispersions and dissolved therein on a laboratory scale, the same does not apply on a production scale and certainly not in quantities which, based on the "free" water, are too large to obtain complete dissolution. If such an attempt is made, clumping or breaking of the dispersion consistently occur. Although it is sometimes possible to rehomogenize the cellulose ether clumps, it is not possible to redisperse dispersion particles once they have coagulated. It is also not apparent to the expert from German Patent 38 14 078-A-1 that early-rain-resistant joint-sealing compounds of the type in question can be produced with other aqueous polymer dispersions than the acrylate dispersions mentioned therein.

Nonionic cellulose ethers are also known as constituents of coating compounds and paints, for example of the type based on aqueous dispersions of organopolysiloxanes, as described in German Patent 12 84 007, or of the type based on vinyl acetate-maleic acid dibutyl ester dispersions, as described in German Patent 21 08 365. However, there is nothing in either of said publications to indicate to the expert that cellulose ethers of the type in question would also be suitable for joint-sealing compounds based on the same polymer dispersions as to lead to the desired effects.

A roof coating compound containing a polyacrylate dispersion as binder and hydroxyethyl cellulose as thickener in addition to fillers and other auxiliaries is described in the journal Resin Review 35, 2. This coating compound is claimed to be particularly resistant to wash-out. However, this property is attributed to the special setting behavior of the polyacrylate emulsion specially developed and used for coating compounds of the type in question. Thus, it was not logical to the expert to use hydroxyethyl cellulose for improving early rain resistance in joint-sealing compounds.

In addition, coating compounds do not satisfy the demands made of joint-sealing compounds, more particularly as laid down in DIN 52 456 "Bestimmung der Verarbeitbarkeit von Dichtstoffen (Determination of the Processability of Sealants)" and in DIN 52 454 "Standvermögen (Stability)".

In regard to stability in particular, joint-sealing compounds, unlike coating compounds are required to have the property of running only slightly, if at all, from a U-profile filled with the compound which, after filling, is placed in an upright position. Coating compounds are generally of lower viscosity because, on the one hand, they are designed for application by spray-coating or roll-coating and, on the other hand, are intended to show a certain flow for levelling of the compound. Although, in principle, joint-sealing compounds and coating compounds may be produced from the same constituents and although it should also be possible to produce a tolerably useful coating compound by dilution of a joint-sealing compound, the converse does not necessarily apply.

It is known from Ullmann, Enzyklopädie der technischen Chemie, 4th Edition, Vol. 9, Verlag Chemie, Weinheim/Bergstraße 1974, pages 208–209, that nonionic cellulose ether derivatives, such as hydroxyethyl cellulose (HEC), hydroxyethyl methyl cellulose (HEMC) and hydroxypropyl methyl cellulose (HPMC), are used in polymeric plasters and emulsion paints inter alia for improving water retention power, open time, wet adhesion and thickening and setting behavior. However, there is nothing to indicate to the expert that cellulose ethers such as these in joint-sealing compounds lead to an improvement in spreadability, smoothing behavior and resistance to spray water of uncured surfaces of these compounds. In addition, paints, such as emulsion paints, and polymeric mortars are different materials from, and can be compared with, joint-sealing compounds. Thus, although polymeric plasters may possibly be used for filling joints, they generally do not have pronounced sealing properties and, in contrast to joint-sealing compounds, can be divided into portions and applied by trowel.

The problem addressed by the present invention was to provide joint-sealing compounds based on polymer dispersions which, in addition to good smoothing behavior, would show early rain resistance before curing without any adverse effect on other desirable properties, such as modulus of elasticity, elongation at break and resilience, or on resistance to migration and freedom from coagulate and specks. Another problem addressed by the invention was to provide a process which would enable compounds such as these to be produced.

DESCRIPTION OF THE INVENTION

Other than in the operating examples, or where otherwise indicated, all numbers expressing quantities of ingredients or reaction conditions used herein are to be understood as modified in all instances by the term "about".

The afore-mentioned problem was solved by early-rain-resistant joint-sealing compounds containing
(a) aqueous polymer dispersions (I),
(b) nonionic cellulose ethers (II) selected from the group consisting of hydroxyethyl, hydroxyethyl-methyl, hydroxypropyl-methyl and hydroxypropyl cellulose,
(c) optionally typical additives, such as fillers, pigments, plasticizers, extenders, thickeners, foam inhibitors, dispersion aids, pH regulators, preservatives and anti-aging agents, and
(d) at least one organic liquid component from the group of typical additives,
which can be produced by thorough mixing of (I) with the other constituents, wherein (II) is added and intermixed in retarded and/or non-retarded form in suspension in the liquid organic component.

The individual constituents of the joint-sealing compound are known as such to the expert, for example from German Patent 38 14 078-A-1. Other suitable polymer dispersions for the production of joint-sealing compounds are commercially available and/or are known to the expert from the patent literature and from the specialist literature, cf. for example E. Flick, Construction and Structural Adhesives and Sealants, Noyes Publications, Park Ridge 1988, or E. Flick, Adhesives and Sealant Compound Formulations, Noyes Publications, Park Ridge 1978. Particularly advantageous joint-sealing compounds contain dispersions of film-forming polyacrylates and/or acrylate copolymers. Other advantageous joint-sealing compounds according to the invention are based on dispersions of film-forming polymers or copolymers selected from the group consisting of ethylene-vinyl acetate, butadiene-styrene, vinyl acetate-maleic acid ester, silicone, urethane, vinyl acetate, methacrylic acid-chloroprene, and isoprene polymers or copolymers. Different polymer dispersions may be combined. Polysulfide dispersions have also proved to be particularly suitable in conjunction with film-forming polymers. In the interests of simplicity, the following text refers only to polymer dispersions.

Most of the constituents are commercially available. Thus, both retarded and non-retarded cellulose ethers are commercially available. Retarded cellulose ethers are understood to be cellulose ethers which, after introduction into water, swell with delay compared with the unretarded substances. This is achieved, for example, by crosslinking with glyoxal at the surface of the cellulose ether particles, as described for example in German Patent 24 15 556. Whereas it has hitherto been standard practice to introduce the cellulose ethers mentioned in aqueous solution or in quantities which dissolve smoothly in the "free" water present in the compounds, the joint-sealing compounds according to the invention are distinguished by a new production process in regard to introduction of the cellulose ethers.

The cellulose ethers suitable for use in accordance with the invention are suspended in the liquid organic component. Such components are, for example, plasticizers, extenders and/or wetting agents. Both retarded and/or non-retarded cellulose ethers may be used.

The aqueous dispersions present in the joint-sealing compounds according to the invention preferably have solids contents of 40 to 75% by weight and, more preferably, 45 to 65% by weight. Their pH value may be at least 6 and, preferably, is in the range from 7 to 9 and, if necessary, is adjusted to those values.

The cellulose ethers present in the joint-sealing compounds according to the invention preferably have a Brookfield viscosity (2% aqueous solution at 20° C.) of at least 5,000 mPa.s. It is preferred to use cellulose ethers having a viscosity of at least 25,000 mPa.s, i.e. for example medium-viscosity hydroxyethyl celluloses. Particularly suitable cellulose ethers are so-called high-viscosity cellulose ethers which have a corresponding viscosity value of at least 70,000 mPa.s, for example high-viscosity hydroxyethyl cellulose. Commercially available high-viscosity hydroxyethyl cellulose has a viscosity of 100,000 mPa.s, for example in the form of a 2% aqueous solution at 20° C.

According to the manufacturers, complete solutions cannot be obtained with hydroxyethyl cellulose, for example Natrosol 250 HHR, at a viscosity above 200,000 mPa.s. With the less hydrophilic cellulose ethers suitable for use in accordance with the invention, this limit is even lower, for example at around 150,000 mPa.s for hydroxypropyl cellulose or at around 100,000 mPa.s for hydroxypropyl methyl cellulose. Gel-like pastes are formed to an increasing extent with increasing concentration. However, this seems to play a particular role in the early rain resistance of the joint-sealing compounds according to the invention. Although the exact mechanism involved has not been elucidated, it may nevertheless be assumed that, if this solubility limit is exceeded, an increasing buildup of a gel-like structure partly contributes towards the compounds remaining resistant or substantially resistant to washing-out by water, such as rain, before curing.

A key factor in this regard is evidently the quantitative ratio of cellulose ether to "free" water which determines whether or not this solubility limit is exceeded. In the present context, "free" water is the water present in the sealing compound which is available to the cellulose ethers to dissolve therein. Accordingly, the total water content of the joint-sealing compound cannot be used for a corresponding calculation. On the contrary, it is important to take into account the fact that the other constituents also require a certain amount of water or bind in more or less solid form. Thus, so-called water values are known for most fillers. In the case of heavy spar for example, the water content is 11 g water per 100 g heavy spar. For silica, for example of the HDK V 15 type (Wacker-Chemie), the water values are 350 to 400 g per 100 g silica. Values such as these provide the expert with an indication of the quantities of "bound" water which must be subtracted from the total water content of sealing compound to obtain the quantity of "free" water. Accordingly, this quantity of "free" water in relation to the quantity of the particular type of cellulose ether used should preferably give a ratio which lies above the particular solubility limit.

The situation becomes somewhat more complicated when the expert has to allow for a water demand which arises when the dispersed polymers contain salt-forming groups. Where an additional water demand such as this arises, the expert may have to consult the relevant manufacturer's specifications, may have to estimate this demand on the basis of empirical values or may have to determine it within approximate limits by simple small-scale tests. In cases where it is intended to produce a joint-sealing compound in which the solubility limit mentioned is exceeded, the cellulose ether cannot be added in the usual form, i.e. in the form of a solution. The process according to the invention provides a method of producing such joint-sealing compounds.

In addition, the joint-sealing compounds according to the invention may contain fillers in a quantity of 0 to 60% by weight and preferably in a quantity of 2 to 60% by weight, based on the total weight of the joint-sealing compounds. Compounds such as these are highly transparent providing they contain little, if any, filler. Low filler contents may be present in particular in compounds in which the fillers have an additional thickening effect, as in the case of silica. If fillers which do not have this additional effect are used as sole fillers, their content is generally between 35 and 60% by weight. In this case, the compounds are referred to as highly filled compounds.

In another advantageous embodiment of the invention, the joint-sealing compounds contain chlorinated hydrocarbons, more particularly chlorinated paraffins, as plasticizers and nonionic surfactants as wetting agents. Commercially available chlorinated paraffins having a chain length of about 10 to 18 carbon atoms and a chlorine content of from about 40 to 70% by weight are preferred.

In one preferred embodiment, the joint-sealing compounds contain
  (a) 25 to 90% by weight polymer dispersion, in the case of highly filled joint-sealing compounds, more particularly, 25 to 40% by weight polymer dispersion,
  (b) 0 to 60% by weight, and more particularly 2 to 60% by weight, fillers,
  (c) 0 to 1% by weight, and more particularly 0.3 to 0.5% by weight, wetting agents,
  (d) 0 to 20% by weight, and more particularly 5 to 15% by weight, plasticizers,
  (e) up to 10 % by weight, and more particularly 4 to 6% by weight, other typical additives such as thickeners, foam inhibitors and pigments,
  (f) quantities of organic liquid component at least sufficient to suspend the cellulose ethers, and
  (g) up to 1.5% by weight cellulose ethers, all percentages by weight based in each case on the total quantity.

The cellulose ether content should be not much less than 0.1% by weight. Good results are obtained in particular with joint-sealing compounds in which the cellulose ether content is between about 0.1 and 0.5% by weight, based on the total quantity, taking into account such basic parameters as the type of cellulose ether and the free water content.

As already mentioned, the cellulose ethers are added in the form of a suspension in the organic liquid component in the production of the joint-sealing compound according to the invention. The ratio of cellulose ether to organic liquid is preferably in the range from 1:2 to 1:4 and, more particularly, is of the order of 1:3. The liquid organic component used is preferably one of the typical additives for joint-sealing compounds, such as for example a plasticizer, extender and/or wetting agent. In addition, the pH regulators, particularly the bases, are only added after the cellulose ethers in the production of the joint-sealing compound. This is particularly advantageous in the case of retarded cellulose ethers because the retardation is eliminated more quickly in the basic range. On the other hand, a neutral to basic pH value of the joint-sealing compounds can have a favorable effect on their stability, particularly their shear stability.

The polymer dispersion is normally introduced first in the production of the joint-sealing compounds according to the invention. In one preferred embodiment of the process, the typical additives, except for the pH regulators, are then added and mixed with the polymer dispersion. The dispersion is then mixed with the cellulose ethers suspended in the organic liquid component and, after incorporation of the fillers, the pH regulators are added and intermixed.

It can also be of advantage to add the filler after the pH regulator.

To prevent air from being stirred in and to prevent air bubbles forming in the product, stirring may be carried out in vacuo.

The joint-sealing compounds are preferably used as intended. They are particularly suitable for use in applications where they are exposed before curing to spray water, rain and the like.

The invention is illustrated by the following Examples.

BRIEF DESCRIPTION OF THE DRAWINGS

The materials described in the examples as well as additional materials produced for comparison purposes were subjected to a wash-out test in which a sprinkling apparatus as seen in FIG. 1 was used. The same apparatus is shown in side view in FIG. 2.

DETAILED DESCRIPTION OF THE DRAWINGS

Figure 1:
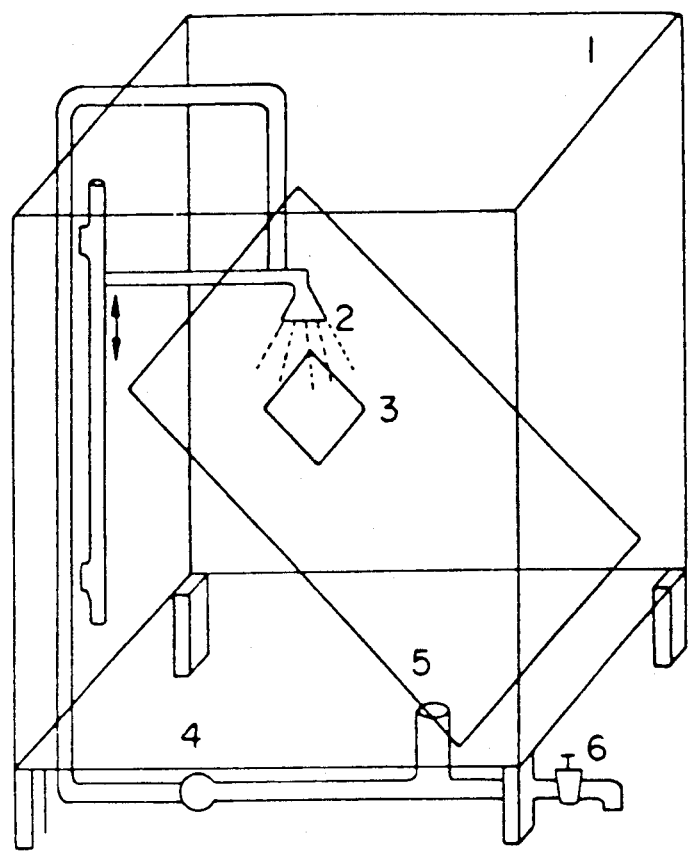
Figure 2:
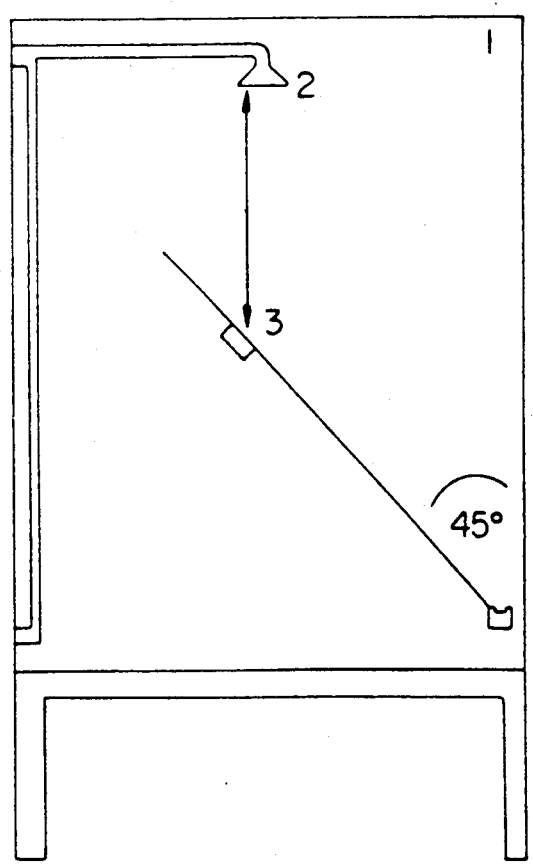

The water spraying apparatus consists of a housing of transparent plastic having the following dimensions: height 70 cm, width 60 cm and depth 60 cm. It comprises a housing 1, a shower head 2, a sample dish 3, a pump 4, a bottom outlet 5 and a shutoff cock 6 for the outlet. The sample dish consists of a receptacle measuring $7 \times 7$ cm for a depth of 2.5 cm. The shower head was a standard hand shower of the type used for personal hygiene and was adjusted in such a way that the sample was uniformly sprayed with water. The distance between the sample dish 3 and shower head 2 was 30 cm.

The water spraying apparatus was operated with demineralized water, an excess pressure of about 0.4 bar being produced by the pump. The water throughput was 300 l/h. The sample was sprayed with water for 5 minutes about 1 minute after introduction and smoothing of the surface of the compounds to be tested. The wash-out (in % by weight) was the difference in weight before and after spraying with water.

Processability was measured in accordance with DIN 52 456 using a 4 mm bore, a pressure of 2 bar and a test volume of 200 ml.

The compounds described in the Examples were also tested for their smoothing behavior. This test, which involved seven people working independently of one another, was carried out by applying a 30 cm long strand of compound to a smooth, flat, dark surface and then smoothing the strand thus applied with a spatula and with the fingers. The smoothing behavior was marked on a scale of 1 (=very good) to 6 (=inadequate).

EXAMPLE 1

The following constituents were intensively mixed for about 45 minutes in a planetary mixer:

1,750 g commercially available aqueous dispersion based on a copolymer of vinyl acetate and ethylene (approximately 60% solids) having a pH value of approx. 4.5 and a viscosity of approx. 1,600 mPa.s at 20° C. (trade name: Vinnapas EP 17, Wacker).

250 g chloroparaffin ($C_{12-14}$, 49% chlorine).

2,800 g barium sulfate (trade name: Schwerspat EWO).

100 g titanium dioxide (trade name: KRONOS RN 56)

25 g sodium carbonate (technically pure commercial product).

25 g ethylene oxide adduct (approx. 9.5 EO) with nonylphenol.

5 g commercially available halogenated preservative.

37 g hydroxyethyl cellulose having a viscosity of approx. 100,000 mPa.s (2% aqueous solution at 20° C.) and a hydroxyethyl group content of 55% by weight (trade name: Natrosol 250 HHR).

The polymer dispersion was introduced first. The ethylene oxide adduct (emulsifier), the preservative, the titanium dioxide (pigment) and part of the chloroparaffin were then added. The hydroxyethyl cellulose was suspended in the remainder of the chloroparaffin and was also added and the whole was thoroughly mixed. The sodium carbonate was then added in the form of a 10% aqueous solution. Finally, the barium sulfate (filler) was added and the whole was stirred until smooth.

This mixture was packed in 310 ml cartridges and remained stable in storage for at least one year at temperatures of up to 35° C.

| | |
|---|---|
| Processability according to DIN 52 456: | 2,300 g/min. |
| Smoothing behavior: | good |
| Wash-out: | 1% loss |

EXAMPLE 2

A composition was prepared in the same way as in Example 1 except that the dispersion of the vinyl acetate-ethylene copolymer was replaced by 1,750 g of a commercially available aqueous dispersion based on a copolymer of styrene and butadiene (approximately 64% solids) having a pH value of approx. 10.5 and a viscosity of approx. 800 mPa.s at 20° C. (trade name: Polysar 2105, Hycar).

This mixture was packed in 310 ml cartridges and remained stable in storage for at least one year at temperatures of up to 35° C.

| | |
|---|---|
| Processability according to DIN 52 456: | 1,980 g/min. |
| Smoothing behavior: | good |
| Wash-out: | 1% loss |

EXAMPLE 3

A composition was prepared in the same way as in Example 1 except that the dispersion of the vinyl acetate-ethylene copolymer was replaced by 1,750 g of a commercially available aqueous dispersion based on a copolymer of vinyl acetate and maleic acid di-n-butyl ester, solids content approx. 53%, pH value 4 to 5, viscosity (Brookfield, 20° C., 20 r.p.m.) 1,000 to 3,000 mPa.s (trade name Mowilith DM 2HB, Hoechst).

This mixture was packed in 310 ml cartridges and remained stable in storage for at least one year at temperatures of up to 35° C.

| | |
|---|---|
| Processability according to DIN 52 456: | 2,030 g/min. |
| Smoothing behavior | good |
| Wash-out | 1% loss |

EXAMPLE 4

A composition was prepared in the same way as in Example 1 except that the dispersion of the vinyl acetate-ethylene copolymer was replaced by 1,750 g of a commercially available aqueous silicone emulsion (drying elastically from the emulsion, approx. 45% solids) having a pH value of approx. 5 and a density of approx. 1.0 at 20° C. (trade name: Wacker Siliconbautenschutzmittel).

This mixture was packed in 310 ml cartridges and remained stable in storage for at least one year at temperatures of up to 35° C.

| | |
|---|---|
| Processability according to DIN 52 456: | 1,790 g/min. |
| Smoothing behavior: | good |
| Wash-out: | 1% loss |

EXAMPLE 5

A composition was prepared in the same way as in Example 1 except that the dispersion of the vinyl acetate-ethylene copolymer was replaced by 1,750 g of a commercially available aqueous dispersion of a polysulfide polymer, approx. 55% solids, pH value 9 to 10 (trade name: ZW 2028, Thiokol).

This mixture was packed in 310 ml cartridges and remained stable in storage for at least one year at temperatures of up to 35° C.

| | |
|---|---|
| Processability according to DIN 52 456: | 1,790 g/min. |
| Smoothing behavior: | good |
| Wash-out: | 2% loss |

EXAMPLE 6

A composition was prepared in the same way as in Example 1 except that the dispersion of the vinyl acetate-ethylene copolymer was replaced by 1,750 g of a commercially available aqueous dispersion of a polyurethane polymer (approx. 40% solids, pH value 7.0 to 7.5, viscosity 10,000 to 18,000 mPa.s, trade name: VP-LA 3110, Henkel).

This mixture was packed in 310 ml cartridges and remained stable in storage for at least one year at temperatures of up to 35° C.

| Processability according to DIN 52 456 | 1,820 g/min. |
| Smoothing behavior | good |
| Wash-out | 3% loss |

EXAMPLE 7

A composition was prepared in the same way as in Example 1 except that the dispersion of the vinyl acetate-ethylene copolymer was replaced by 1,750 g of a commercially available aqueous dispersion based on a polyvinyl acetate, solids content approx. 50%, pH value approx. 6 to 7, viscosity approx. 10,000 to 18,000 mPa.s (Brookfield), (trade name: Mowilith DLR, Hoechst).

This mixture was packed in 310 ml cartridges and remained stable in storage for at least one year at temperatures of up to 35° C.

| Processability according to DIN 52 456 | 1,670 g/min |
| Smoothing behavior | good |
| Wash-out | 1% loss |

EXAMPLE 8

A composition was prepared in the same way as in Example 1 except that the dispersion of the vinyl acetate-ethylene copolymer was replaced by 1,750 g of a commercially available aqueous dispersion based on a copolymer of chloroprene and methacrylic acid, solids content approx. 46.5 to 48.5%, pH value approx. 9, (trade name: Neoprene Latex 115).

This mixture was packed in 310 ml cartridges and remained stable in storage for at least one year at temperatures of up to 35° C.

| Processability according to DIN 52 456 | 2,030 g/min. |
| Smoothing behavior | good |
| Wash-out | 1% loss |

EXAMPLE 9

A composition was prepared in the same way as in Example 1 except that the dispersion of the vinyl acetate-ethylene copolymer was replaced by 1,750 g of a commercially available aqueous dispersion based on a natural rubber latex, solids content approx. 70%, pH value approx. 9 to 10, (trade name: Revertex Standard).

This mixture was packed in 310 ml cartridges and remained stable in storage for at least one year at temperatures of up to 35° C.

| Processability according to DIN 52 456: | 1,740 g/min. |
| Smoothing behavior: | good |
| Wash-out: | 1% loss |

EXAMPLE 10

Examples 1 to 9 were remeasured after the hydroxyethyl cellulose used therein had been replaced by a commercially available methyl hydroxypropyl cellulose (MHPC) having a Brookfield viscosity of approx. 20,000 mPa.s (2% solution at 20° C.) and a hydroxypropyl group content of 3.2% by weight. The processabilities, as measured in accordance with DIN 52 456, are comparable. The smoothing behavior is good.

| Result: | |
| Composition acc. to Example No. but with MHPC | Wash-out loss in % |
| --- | --- |
| 1 | 1.8 |
| 2 | 1.0 |
| 3 | 1.0 |
| 4 | 1.4 |
| 5 | 2.6 |
| 6 | 3.0 |
| 7 | 1.4 |
| 8 | 1.0 |
| 9 | 1.3 |

EXAMPLE 11

Examples 1 to 9 were remeasured after the hydroxyethyl cellulose used therein had been replaced by a commercially available hydroxypropyl cellulose (HPC) having a Brookfield viscosity of approx. 5,000 mPa.s (2% solution at 20° C.) and a hydroxypropyl group content of 70% by weight. The processabilities, as measured in accordance with DIN 52 456, are comparable. The smoothing behavior is good.

| Result: | |
| Composition acc. to Example No. but with HPC | Wash-out loss in % |
| --- | --- |
| 1 | 2.2 |
| 2 | 1.9 |
| 3 | 2.3 |
| 4 | 1.3 |
| 5 | 2.0 |
| 6 | 2.5 |
| 7 | 1.0 |
| 8 | 2.0 |
| 9 | 1.0 |

Comparison Example A

Examples 1 to 9 were remeasured after the hydroxyethyl cellulose (HEC) had been replaced by a commercially available aqueous polyacrylic acid dispersion (approx. 25% solids, trade name: Rohagit SD 15). The processabilities, as measured in accordance with DIN 52 456, were comparable. Smoothing behavior was unsatisfactory; wash-out behavior was less favorable.

| Results of wash-out test: | |
| Composition acc. to Example No. (without HEC, with polyacrylic acid dispersion) | Wash-out loss in % |
| --- | --- |
| 1 | 4 |
| 2 | 10 |
| 3 | 11 |
| 4 | 28 |
| 5 | 30 |
| 6 | 100 |
| 7 | 14 |
| 8 | 4 |
| 9 | 16 |

Comparison Example 8

Examples 1 to 9 were repeated without hydroxyethyl cellulose (HEC) (trade name: Natrosol 250 HR). Smoothing behavior was unsatisfactory; wash-out behavior was less favorable Results of the wash-out test

| Composition acc. to Example No. (without HEC) | Wash-out loss in % |
|---|---|
| 1 | 14 |
| 2 | 20 |
| 3 | 100 |
| 4 | 64 |
| 5 | 95 |
| 6 | 100 |
| 7 | 95 |
| 8 | 7 |
| 9 | 96 |

EXAMPLE 12

The following constituents were intensively mixed for about 45 minutes in a planetary mixer:

1,750 g commercially available aqueous polybutyl acrylate dispersion (solids content approx. 62%) having a pH value of 6.0 to 6.5, a glass transition temperature Tg of $-50°$ C., a viscosity of approx. 250 mPa.s at 23° C. and an average particle size of 0.4 μm,
250 g chloroparaffin ($C_{12-14}$, 49% chlorine),
2,800 g barium sulfate (trade name: Schwerspat EWO),
100 g titanium dioxide (trade name: KRONOS RN 56)
25 g sodium carbonate (technically pure commercial product),
25 g ethylene oxide adduct (approx. 9.5 EO) with nonylphenol,
5 g commercially available halogenated preservative,
37 g hydroxyethyl cellulose having a viscosity of approx. 4,000 mPa.s (1% aqueous solution at 20° C.) and a hydroxyethyl group content of 55% by weight (trade name: Natrosol 250 HHR).

The polymer dispersion was introduced first. The ethylene oxide adduct (emulsifier), the preservative, the titanium dioxide (pigment) and part of the chloroparaffin were then added. The hydroxyethyl cellulose was suspended in the remainder of the chloroparaffin and was also added and the whole was thoroughly mixed. The sodium carbonate was then added in the form of a 10% aqueous solution. Finally, the barium sulfate (filler) was added and the whole was stirred until smooth.

This mixture was packed in 310 ml cartridges and remained stable in storage for at least one year at temperatures of up to 35° C.

| Processability according to DIN 52 456: | 2,260 g/min. |
|---|---|
| Smoothing behavior: | good |
| Wash-out: | 1% loss |

When a total of 50 g of the same hydroxyethyl cellulose was added the following results were obtained:

| Processability according to DIN 52 456: | 1,300 g/min. |
|---|---|
| Smoothing behavior: | very good |
| Wash-out: | 0.3% loss |

EXAMPLE 13

The same constituents as in Example 12 were intensively mixed in a planetary mixer for about 45 minutes in the same way as in that Example, except that the hydroxyethyl cellulose was replaced by 20 g of a hydroxypropyl cellulose having a viscosity of approx. 5,000 mPa.s (2% aqueous solution, 20° C.) and a hydroxypropyl group content of 70% (trade name: Klucel M).

The mixture was packed in 310 ml plastic cartridges and remained stable in storage for at least one year at temperatures of up to 35° C.

| Processability according to DIN 52 456: | 2,100 g/min. |
|---|---|
| Smoothing behavior: | good |
| Wash-out: | 5% loss |

EXAMPLE 14

The same constituents as in Example 12 were intensively mixed in a planetary mixer for about 45 minutes in the same way as in that Example, except that the hydroxyethyl cellulose was replaced by 37 g of a methyl hydroxypropyl cellulose having a viscosity of approx. 20,000 mPa.s (2% aqueous solution, 20° C.) and a hydroxypropyl group content of 3.2% by weight (trade name: Culminal MHPC 20000 PR)

The mixture was packed in 310 ml plastic cartridges and remained stable in storage for at least one year at temperatures of up to 35° C.

| Processability according to DIN 52 456: | 2,870 g/min. |
|---|---|
| Smoothing behavior: | good |
| Wash-out: | 3.5% loss |

EXAMPLE 15

The following constituents were intensively mixed for about 45 minutes in a planetary mixer:

4,700 g aqueous dispersion of a polybutyl acrylate containing small quantities of copolymerized acrylonitrile (solids content 60%), pH value approx. 5-6,
52 g ethylene oxide adduct (approx. 9.5 EO) with nonylphenol,
25 g commercially available silicone/hydrocarbon foam inhibitor mixture,
13 g commercially available phenolic preservative (Parmetol, Schülke-Mayr, Hamburg)
102 g disperse silica (commercial product HDK V 15, Wacker-Chemie),
36 g aqueous ammonia solution (25%),
52 g chloroparaffin ($C_{10-14}$, 49% chlorine), and
18 g of a hydroxyethyl cellulose having a viscosity of approx. 4,000 mPa.s (1% aqueous solution) and a hydroxyethyl group content of 55% by weight (trade name: Natrosol 250 HHR).

The dispersion was introduced first. The ethylene oxide adduct (emulsifier), the preservative and foam inhibitor were then added. The hydroxyethyl cellulose was suspended in the chloroparaffin and was also added and the whole was thoroughly mixed. The 25% aqueous ammonia solution was then added. Finally, the disperse silica (filler) was added and the whole was stirred until smooth.

The mixture was packed in 310 ml plastic cartridges and remained stable in storage for at least one year at temperatures of up to 35° C.

| | |
|---|---|
| Processability according to DIN 52 456 | 3,700 g/min |
| Smoothing behavior | good |
| Wash-out | 4.5% loss |

EXAMPLE 16

The following constituents were intensively mixed for a total of about 30 minutes in a planetary mixer:

1,200 g commercially available aqueous dispersion of an acrylate copolymer containing approx. 55% by weight solids and free carboxy groups (trade name: Primal E 1785).
200 g polybutene as extender.
20 g ethylene oxide adduct as wetting agent.
4 g commercially available halogenated preservative (AKTIZID TL 526).
200 g butyl benzyl phthalate as plasticizer.
200 g water.
80 g aliphatic low-aromatic solvent (SHELLSOL D 60).
4 g high-viscosity hydroxyethyl cellulose (NATROSOL 250 HHR).
2,040 g uncoated chalk.
40 g titanium dioxide. and
12 g 25% aqueous ammonia solution.

The dispersion was introduced first. Part of the polybutene, the ethylene oxide adduct, the preservative, the plasticizer, the water and the solvent were then added with intensive mixing. The remainder of the polybutene was suspended with the hydroxyethyl cellulose in a ratio of 3:1 and the resulting suspension was also added while mixing, followed by stirring for 5 minutes. The chalk and the titanium dioxide were then incorporated and the whole was stirred for 10 minutes. After addition of the ammonia solution, the mixture was stirred in a vacuum of 40 mbar for another 15 minutes until it was smooth.

| | |
|---|---|
| Processability according to DIN 52 456 | 1,000 g/min. |
| Smoothing behavior | good |
| Wash-out | 4.3% loss |

EXAMPLE 17

A composition was prepared in the same way as in Example 1, except that the Natrosol 250 HHR was replaced by a non-retarded high-viscosity hydroxyethyl cellulose of otherwise the same specification (trade name: Natrosol 250 HH)

| | |
|---|---|
| Processability according to DIN 52 456: | 2,300 g/min. |
| Smoothing behavior: | good |
| Wash-out: | 1% loss |

Comparison Example C a) Example 12 was repeated leaving out the hydroxyethyl cellulose: 23% wash-out was obtained.

b) Example 12 was repeated using carboxymethyl cellulose (DS 0.8), viscosity 400 mPa.s (2% aqueous solution, 20° C.) instead of the hydroxyethyl cellulose: 27% wash-out was obtained.

c) Example 15 was repeated leaving out the hydroxyethyl cellulose: 20% wash-out was obtained.

What is claimed is:

1. In the process of preparing an early-rain-resistant joint-sealing composition consisting essentially of adding to a mixing vessel
   (a) 25 to 90% by weight of an aqueous dispersion containing from about 40 to about 75% by weight of film-forming polymers or copolymers selected from the group consisting of ethylene-vinyl acetate, butadienestyrene, vinyl acetate-maleic acid ester, silicone, urethane, vinyl acetate, methacrylic acid-chloroprene, isoprene, polysulfide, acrylate and polyacrylate;
   (b) adding to said vessel from about 2 to about 60% by weight of a filler;
   (c) adding to said vessel from 0 to about 1% by weight of a wetting agent;
   (d) adding to said vessel from 0 to about 20% by weight of a plasticizer;
   (e) adding to said vessel up to about 10% by weight of an additive selected from a thickener, foam inhibitor, and pigment; the improvement comprising
   (f) forming a suspension in an organic liquid of from about 0.1 to about 1.5% by weight of a nonionic cellulose ether selected from the group consisting of hydroxyethyl cellulose, hydroxyethylmethyl cellulose, hydroxypropyl-methyl cellulose and hydroxypropyl cellulose having a Brookfield viscosity in a 2% aqueous solution at about 20° C. of at least about 5,000 mPa.s, based on the weight of said composition; and
   (g) adding the suspension prepared in step (f) to said vessel followed by thorough mixing of the composition 2. The process as in claim 1 wherein said nonionic cellulose ether is in retarded or non-retarded form when mixed with said organic liquid.

3. The process as in claim 1 wherein the ratio of said nonionic cellulose ether to free water is selected so that said cellulose ether is not completely dissolved in said free water.

4. The process as in claim 1 wherein said organic liquid is selected from a plasticizer, extender, and wetting agent.

5. The process as in claim 1 wherein said nonionic cellulose ether has a Brookfield viscosity in a 2% aqueous solution at about 20° C. of at least about 25,000 mPa.s.

6. The process as in claim 4 wherein said plasticizer comprises a chlorinated hydrocarbon.

7. The process as in claim 6 wherein said chlorinated hydrocarbon comprises chlorinated paraffin.

8. The process as in claim 1 including (h) adding to said vessel a pH regulator.

9. The process as in claim 1 wherein said cellulose ether is mixed with said organic liquid in a ratio of from about 1:2 to about 1:4, respectively.

10. In an early-rain-resistant joint-sealing composition prepared by adding to a mixing vessel
    (a) 25 to 90% by weight an aqueous dispersion containing from about 40 to about 75% by weight of film-forming polymers or copolymers selected from the group consisting of ethylene-vinyl acetate, butadienestyrene, vinyl acetate-maleic acid ester, silicone, urethane, vinyl acetate, methacrylic acid-chloroprene, isoprene, polysulfide, acrylate and polyacrylate;

(b) adding to said vessel from about 2 to about 60% by weight of a filler;
(c) adding to said vessel from 0 to about 1% by weight of a wetting agent;
(d) adding to said vessel from 0 to about 20% by weight of a plasticizer;
(e) adding to said vessel up to about 10% by weight of an additive selected from a thickener, foam inhibitor, and pigment; the improvement comprising
(f) forming a suspension in an organic liquid of from about 0.1 to about 1.5% by weight of a nonionic cellulose ether selected from the group consisting of hydroxyethyl cellulose, hydroxyethyl-methyl cellulose, hydroxypropyl-methyl cellulose and hydroxypropyl cellulose having a Brookfield viscosity in a 2% aqueous solution at about 20° C. of at least about 5,000 mPa.s, based on the weight of said composition; and
(g) adding the suspension prepared in step (f) to said vessel followed by thorough mixing of the composition 11. A composition as in claim 10 wherein said nonionic cellulose ether is in retarded or non-retarded form when mixed with said organic liquid.

12. A composition as in claim 10 wherein the ratio of said nonionic cellulose ether to free water is selected so that said cellulose ether is not completely dissolved in said free water.

13. A composition as in claim 10 wherein said organic liquid is selected from a plasticizer, extender, and wetting agent.

14. A composition as in claim 10 wherein said nonionic cellulose ether has a Brookfield viscosity in a 2% aqueous solution at about 20° C. of at least about 25,000 mPa.s.

15. A composition as in claim 13 wherein said plasticizer comprises a chlorinated hydrocarbon.

16. A composition as in claim 15 wherein said chlorinated hydrocarbon comprises chlorinated paraffin.

17. A composition as in claim 10 including a pH regulator.

18. A composition as in claim 10 wherein said cellulose ether is mixed with said organic liquid in a ratio of from about 1:2 to about 1:4, respectively.

19. In a process for sealing a joint or gap in a building structure exposed to rain or water before a sealing compound is cured, comprising applying to said joint or gap an early-rain-resistant joint-sealing composition prepared by adding to a mixing vessel
(a) 25 to 90% by weight of an aqueous dispersion containing from about 40 to about 75% by weight of film-forming polymers or copolymers selected from the group consisting of ethylene-vinyl acetate, butadienestyrene, vinyl acetate-maleic acid ester, silicone, urethane, vinyl acetate, methacrylic acid-chloroprene, isoprene, polysulfide, acrylate and polyacrylate;
(b) adding to said vessel from about 2 to about 60% by weight of a filler;
(c) adding to said vessel from 0 to about 1% by weight of a wetting agent;
(d) adding to said vessel from 0 to about 20% by weight of a plasticizer;
(e) adding to said vessel up to about 10% by weight of an additive selected from a thickener, foam inhibitor, and pigment; the improvement comprising
(f) forming a suspension in an organic liquid of from about 0.1 to about 1.5% by weight of a nonionic cellulose ether selected from the group consisting of hydroxyethyl cellulose, hydroxyethylmethyl cellulose, hydroxypropyl-methyl cellulose and hydroxypropyl cellulose having a Brookfield viscosity in a 2% aqueous solution at about 20° C. of at least about 5,000 mPa.s, based on the weight of said composition; and
(g) adding the suspension prepared in step (f) to said vessel followed by thorough mixing of the composition.

* * * * *